US007215088B1

(12) United States Patent
Clark et al.

(10) Patent No.: US 7,215,088 B1
(45) Date of Patent: May 8, 2007

(54) SYSTEM AND ARCHITECTURE FOR CONTROLLING LIGHTING THROUGH A LOW-VOLTAGE BUS

(75) Inventors: Walter Clark, Palo Alto, CA (US); Daniel Nunez, Fremont, CA (US); Douglas Scott Bourne, Mountain View, CA (US)

(73) Assignee: Finelite, Union City, CA (US)

( * ) Notice: Subject to any disclaimer, the term of this patent is extended or adjusted under 35 U.S.C. 154(b) by 12 days.

(21) Appl. No.: 10/927,400

(22) Filed: Aug. 25, 2004

Related U.S. Application Data

(60) Provisional application No. 60/498,141, filed on Aug. 26, 2003, provisional application No. 60/586,642, filed on Jul. 9, 2004.

(51) Int. Cl.
*G05B 11/01* (2006.01)
*G06F 15/46* (2006.01)

(52) U.S. Cl. ........................ 315/294; 315/312; 700/11; 700/295; 364/138

(58) Field of Classification Search ................ 315/312, 315/316, 149–159, 291–296; 364/138, 131–133; 340/310 R
See application file for complete search history.

(56) References Cited

U.S. PATENT DOCUMENTS 4,203,096 A * 5/1980 Farley et al. ............... 340/538
5,289,365 A * 2/1994 Caldwell et al. ............... 700/9
5,621,662 A * 4/1997 Humphries et al. ......... 700/276
6,138,241 A * 10/2000 Eckel et al. ................ 713/300
6,256,544 B1 * 7/2001 Weissinger ..................... 700/1
6,297,724 B1 * 10/2001 Bryans et al. ............. 340/3.51
6,388,396 B1 * 5/2002 Katyl et al. ................. 315/294
6,388,399 B1 * 5/2002 Eckel et al. ................ 315/312
6,393,608 B1 * 5/2002 Pulford et al. ................ 363/16
6,813,525 B2 * 11/2004 Reid et al. ..................... 700/19
7,102,509 B1 * 9/2006 Anders et al. ......... 340/539.13
2004/0002792 A1 * 1/2004 Hoffknecht ................. 700/295

OTHER PUBLICATIONS

"Daylighting in Schools—An Investigation into the Relationship Between Daylighting and Human Performance", Heschong Mahone Group, Aug. 20, 1999, pp. i-30.

(Continued)

*Primary Examiner*—Tho Phan
*Assistant Examiner*—Chuc Tran
(74) *Attorney, Agent, or Firm*—Haverstock & Owens LLP

(57) ABSTRACT

A system and architecture for managing lighting through a seamless low-voltage bus network is disclosed. The system comprises a plurality of control units that serve as nodes for integrating devices, such as light fixtures, control switches and sensors into the bus. Each of the control units preferably includes a printed circuit board and node interconnects for assembling the low-voltage bus and for integrating the devices. Alternatively, the system comprises a central hub with a master printed circuit control board and a plurality of interconnects for assembling the bus and for integrating the devices.

16 Claims, 6 Drawing Sheets

OTHER PUBLICATIONS

"Re-Analysis Summary—Daylighting in Schools, Additional Analysis", Heschong Mahone Group, Feb. 14, 2002, pp. 1-5.

"Dali Dimming Controls-ezDali Relay Module", 2 pages, no date available.

"Dali Dimming Controls-ezDali Dimming System", 3 pages, no date available.

"Guideform Specification-ezDali Dimming Controls", AIA Division 16 Specifications—Section 16570, pp. 5, no date available.

"The Value of Lighting Quality Light Controls Daylighting", Energy Effective Lighting for Classrooms: Combining Quality Design and Energy Efficiency, 2002, 7 pages, no date available.

"The Next Wave in Lighting Energy Savings", Technical Assistance, www.eere.energy.gov/femp/, Fall 2003, pp. 21-22, no date available.

"The CHPS Classroom", 2003 CHPS, Inc., pp. 1, no date available.

"Ballast Guide-Fluorescent Dimming", Lutron, pp. 1-27, no date available.

"Classrooms-Light Controls: Patterns for Design", pp. 1-9, no date available.

* cited by examiner

SYSTEM AND ARCHITECTURE FOR CONTROLLING LIGHTING THROUGH A LOW-VOLTAGE BUS

RELATED APPLICATIONS

This application claims priority of U.S. provisional application Ser. No. 60/498,141, filed Aug. 26, 2003, and entitled "System and Architecture for Supporting and Managing Electrical Devices", by this same inventor. This application incorporates U.S. provisional application Ser. No. 60/498,141 in its entirety by reference.

This application also claims priority of U.S. provisional application, Ser. No. 60/586,642, filed Jul. 9, 2004, and entitled "System and Architecture for Supporting and Managing Electrical Devices", by this same inventor. This application incorporates U.S. provisional application, Ser. No. 60/586,642 in its entirety by reference.

FIELD OF THE INVENTION

This invention relates to electrical devices. More particularly, this invention relates to systems and architectures for supporting and managing lighting fixtures through a bus and coupled to periphery low-voltage devices.

BACKGROUND OF THE INVENTION

When retrofitting buildings and other structures with energy-saving devices, such as dimming switches, motion sensors/detectors and the like, the installation generally requires tapping into existing electrical systems and wiring. Low voltage lines are often run along walls and through ceilings to interface the low voltage devices, such as the motion detector or sensor, with the high voltage devices, such as light fixtures. Running these low voltage lines can be difficult, especially when walls and/or ceilings of the building are made of concrete, as is often the case with office buildings and schools.

In addition, existing wiring, electrical boxes and receptacles are generally not universal or standardized and, therefore, each retrofit installation of energy saving devices in a building is typically a customized project, wherein all wire leads are separately connected, taped and secured with nuts. In addition to the installation challenges, low voltage wiring that is exposed or tacked to walls and ceilings can be subject to physical disturbances that result in system failures.

In addition to the aforementioned shortcomings, existing wiring, electrical boxes and receptacles generally require multiple power feeds for each control switch and its corresponding low voltage devices.

Problems also exist for new construction lighting projects. Lighting control system for new buildings are generally very expensive both for entire building systems that require full-time support and dedicated controls for each single function. Conventional attempts to combine control functions tends to focus on digital systems that require an intelligent controller and intelligent ballasts. Other general purpose control systems require extensive programming of scenarios to make the system operate.

Accordingly, there is a need for a system and architecture to interface low voltage periphery devices, such as motion sensors, dimming systems, mode controls, special light fixtures, and other electrical devices from a switch on a main control panel, with high voltage devices, such as overhead light fixtures. The system and architecture are preferably easy to install, easy to service and allow for easy replacement of fixtures and/or devices within the architecture.

SUMMARY OF THE INVENTION

In one aspect of the present invention, a decentralized low-voltage bus for managing a load circuit with lights comprises a plurality of control units for integrating a sensor and a control switch into the decentralized low-voltage bus. The decentralized low-voltage bus can further comprise cables for integrating the control units, the sensor and the control switch. The control units and the cables can comprise RJ45 interconnects for electrically coupling to the cables. The decentralized low-voltage bus can further comprise a second sensor coupled to the decentralized low-voltage bus, the second sensor coupled to the sensor via the cable. The sensor and the control switch can be low-voltage periphery devices. Power can be provided to the low-voltage periphery devices via the cables. Control signals can be provided from the low-voltage periphery devices via the cables. Each control unit can comprise an LED display for indicating a mode of operation. Each control unit can comprise dip switches for changing a mode of operation of the sensor or the control switch. A second sensor can be coupled to the decentralized low-voltage bus by connecting the second sensor to the sensor. The lights can be coupled to an external power source. Each light can comprise one of the plurality of control units, and the low-voltage power is supplied by the lights to the decentralized low-voltage bus via the control units within the lights. The decentralized low-voltage bus can further comprise a relay assembly to interface the decentralized low-voltage bus, the lights, and an external power source. The relay assembly can include one of the plurality of control units to provide low-voltage power to the decentralized low-voltage bus and to receive control signals from the sensor and the control switch. The relay assembly can be coupled to the load circuit.

In another aspect of the present invention, a power distribution system comprises a hub, the hub comprising connection ports for coupling to low-voltage periphery devices and for distributing power to the low voltage periphery devices. The hub can be coupled to a high-voltage line and configured to control a load through the high voltage line. The power distribution system can further comprise cables with connection features configured to securely engage the connection ports. The connection ports can comprise female RJ45 connectors and the connection features of the cables comprise male RJ45 connectors. The power distribution system can further comprise a printed circuit board for distributing low voltage between the plurality of connection ports. The power distribution system can further comprise a switching means for controlling a high-voltage device. The switching means can be configured for controlling the high voltage device in response to control signal received from one or more of the low-voltage periphery devices.

In yet another aspect of the present invention, a light control hub is configured to couple to a plurality of light fixtures and to one or more low-voltage periphery devices. The light control hub is configured to control levels of light output from the plurality of light fixtures based on received control signals from the one or more low-voltage periphery devices. The light control hub can include a printed logic circuit for distributing low voltage power to the one or more low-voltage periphery devices and for receiving commands from one or more of the low-voltage periphery devices. At least one of the low-voltage periphery devices can comprise a sensor. At least one of the low-voltage periphery devices can comprise a control switch.

In still yet another aspect of the present invention, a canopy installation kit for controlling light fixtures comprises a controller unit configured to generate control signals based on a condition, a hub with a circuit configured to receive the control signals from the controller unit and control loads to light fixtures based on the control signals, and interconnecting cables for coupling the controller unit to the hub.

DETAILED DESCRIPTION OF THE PRESENT INVENTION

Figure 1:
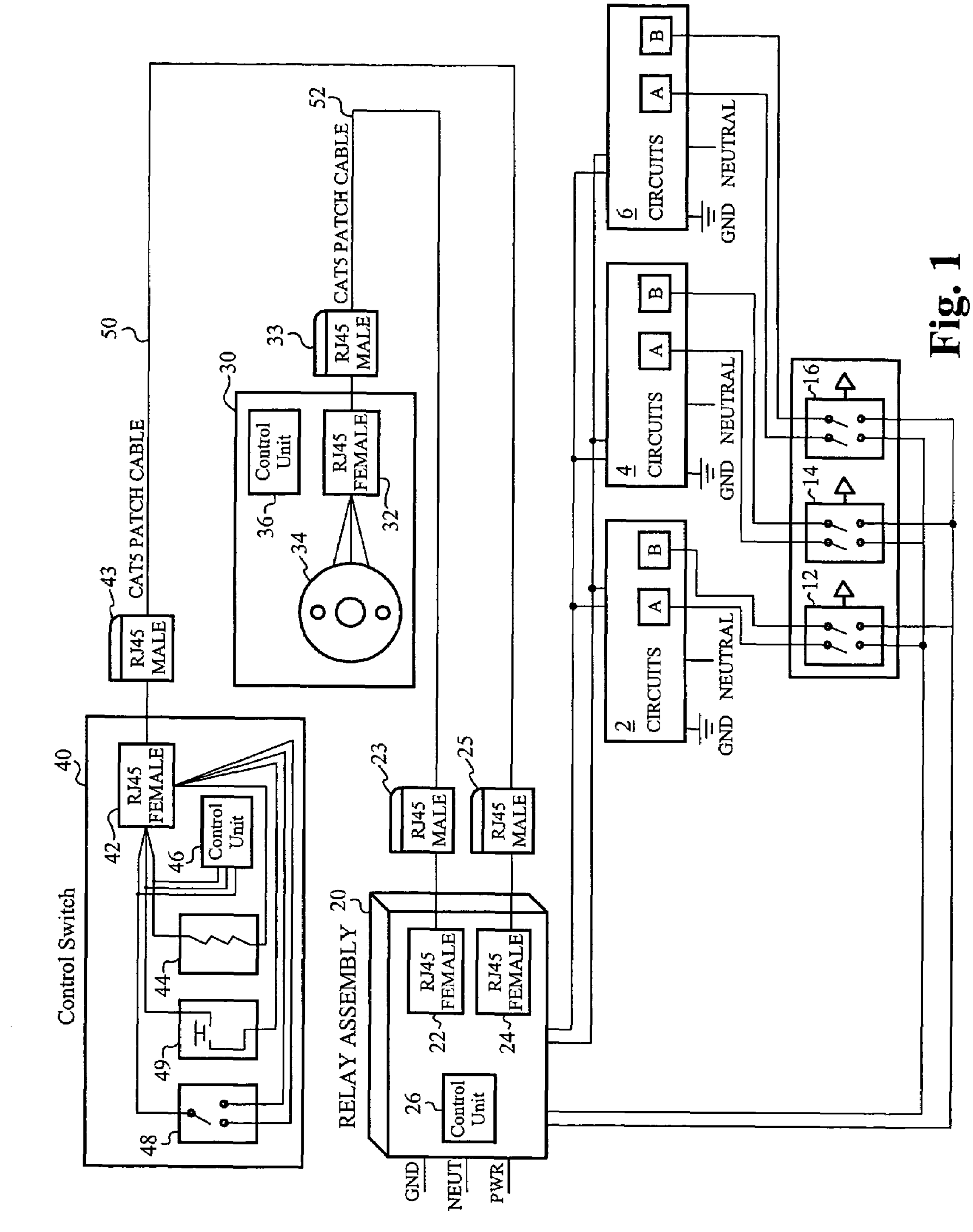
FIG. 1 shows a schematic representation of an exemplary decentralized system as applied to a new lighting configuration, in accordance with the embodiments of the present invention.

Embodiments of the present invention are directed to a system and an architecture for supporting and managing load circuits with a low-voltage bus. The low-voltage bus is configured to integrate low-voltage periphery devices, such as motion sensors, light sensors, other sensor devices, control switches and/or any other devices that are configured to control power to light fixtures or appliances. In accordance with a preferred embodiment of the invention, the low-voltage bus is configured to integrate at least one sensor and at least one control switch, such as a dimmer switch, to control and manage power output to light fixtures, such as over-head fluorescent lights.

In accordance with the embodiments of the present invention, the system operates under what is referred to herein as a decentralized architecture. In a decentralized architecture there are a plurality of node locations for integrating the light fixtures, sensors, and control switches, referred to herein as integrated devices, into the low-voltage bus. Each of the node locations preferably includes a control unit. The control unit includes a printed circuit control board with printed circuit logic that allow the integrated devices to operate in accordance with an operation or management protocol. The printed circuit control boards are coupled to several power source points over the low-voltage bus and at least one load circuit that is configured to power the light fixtures.

The low-voltage bus enables access to all control and power signals from all points on the network of node. As such, all signals are accessible from any nodes. In the preferred embodiment, eight signals are conveyed over the low-voltage bus. The eight signals used are for low voltage power, low voltage common, "quiet time" control signal, mode control, occupancy signal, positive dimming control, negative dimming control, and an additional control mode signal. The low voltage power provides power to all low-voltage periphery devices and provides access to constant "logic high" for any control switching requirements. Low voltage common provides a common reference ground to the system. The "quiet time" control signal provides a momentary disabling control signal to prevent use of control signals sent by a low-voltage periphery device. In the preferred embodiment, the "quiet time" control signal provides a control signal to prevent an occupancy sensor from turning off the lights for a preset period of time.

The mode control provides a logic signal to indicate if the electrical lights are in general mode or are in an audio/video mode. The general mode is also referred to as an "uplight" mode, and the audio/video mode is also referred to as a "downlight" mode. The occupancy signal provides a signal from a low-voltage periphery device. In the preferred embodiment, the occupancy signal indicates the occupancy state of a room. The positive dimmer control and the negative dimmer control provide control signals used by a dimmer switch. In the preferred embodiment, the positive and negative dimmer controls integrate directly with a standard 0–10 volt DC dimming protocol used for fluorescent dimming ballasts.

The additional control mode signal is used to control an additional low-voltage periphery device. The additional control mode signal can be used to control an additional set of luminaries on a separate switching scheme, for example a whiteboard light, while integrating seamlessly with the overall control architecture.

Additional signals to the abovementioned eight signals can be implemented using a larger number of wires in each cable and connector. Further, the universality of the signals across the system allows any variation of parallel or series wiring, as long as all devices are interconnected.

The printed circuit control boards provide connections between integrated devices over the low-voltage bus and allows the integrated devices to be collectively managed and operated in accordance with the protocol. Preferably, the control units include plugs that couple to the printed circuit control boards, such that other integrated devices can be added or removed from the low-voltage bus simply by plugging and unplugging the integrated devices into an appropriate node on the bus. In an exemplary application of the decentralized architecture, a system for managing lights is easily customized, retrofitted to existing lighting, and/or modified to suit the application at hand without requiring the installation of new high voltage lines.

In accordance with the preferred embodiment, each control unit includes one or more RJ45 interconnects that are electrically coupled to the printed circuit control boards and to cables, such as a CAT5 patch cable, that includes complementary RJ45 interconnects. Preferably, sensor control switches, and the like are also configured with RJ45 interconnects, such that a low-voltage bus for lighting management can be easily assembled by plugging nodes and devices together through the CAT5 patch cables.

In accordance with further embodiments of the present invention, the printed circuit control boards include dip switches for changing a mode of operation of one or more of the networked or integrated devices, such as a sensor or control switch. For example, the printed circuit control boards include dip switches that can be used to override the operation of a sensor or control switch in the event that the sensor or control switch fails or the light requirements change. Further, the printed circuit control boards can be configured with any number of LEDs that provide diagnostic capabilities. For example, an LED light can be used to indicate whether or not the printed circuit control board is receiving power and another LED light can be used to indicate whether or not the printed circuit control board is receiving a signal from a sensor.

The decentralized system can be applied as a new configuration or can be applied to an existing configuration, as in a retrofit. FIG. 1 illustrates an exemplary decentralized system as applied to a new lighting configuration. The decentralized system in FIG. 1 includes light fixtures 2, 4, and 6, switches 12, 14, and 16, relay assembly 20, occupancy sensor 30 and control switch 40. The control switch 40 is coupled to the relay assembly 20 via cable 50. Occupancy sensor 30 is coupled to the relay assembly 20 via cable 52. Cable 50 includes a connector 43 on a first end and a connector 25 on a second end. Cable 52 includes a connector 33 on a first end and a connector 23 on a second end. Each of the cables 50 and 52 are preferably CAT5 patch cables, and each connector 23, 25,33, and 43 are preferably male RJ45 connectors.

Light fixtures 2, 4, and 6, are coupled to corresponding switches 12, 14, and 16. Power is supplied from a conventional external power source (not shown) to the relay assembly 20. The relay assembly 20 communicates with and provides low-voltage power to the control switch 40 and the occupancy sensor 30. The relay assembly 20 includes a control unit 26 and two connectors 22 and 24. The control unit 20 preferably comprises a printed circuit control board with printed circuit logic that allows coupled integrated devices, such as control switch 40 and occupancy sensor 30, to operate in accordance with an operation and management protocol. The connectors 22 and 24 are preferably plugs that couple the control unit 26 within the relay assembly 20 to other control units of coupled integrated devices. The plugs are preferably female RJ45 connectors for coupling to male RJ45 connectors. Although relay assembly 20 is described as having two connectors 22 and 24, it should be understood that the relay assembly 20 can include more than two connectors. In the preferred embodiment, the control unit 26 and the connectors 22 are configured on the circuit control board. Alternatively, the control unit 26 is separate from the connectors 22.

The connector 22 preferably receives sensor detection signals from the occupancy sensor 30. The received sensor detection signals are directed to the control unit 26. In response to the sensor detection signals, the control unit 26 provides control signals that direct the switches 12, 14, and 16 to switch on, thereby turning on light fixtures 2, 4, and 6. The control unit 26 can be configured such that if no sensor detection signals are received from the occupancy sensor 30 within a predetermined time frame, then the control unit 26 provides control signals that direct the switches 12, 14, and 16 to switch off, thereby turning off the light fixtures 2, 4, and 6.

The occupancy sensor 30 includes control unit 36, sensor detection circuitry 34, and connector 32. The sensor detection circuitry 34 preferably provides motion and sound detection, as is well known in the art. The control unit 36 is coupled to the sensor detection circuitry 34 and the connector 32. In the preferred embodiment, the control unit 36 and the connector 32 are configured on a single circuit control board. Alternatively, the control unit 36 is separate from the connector 32. Upon detection of motion or sound, the sensor detection circuitry sends sensor detection signals to control unit 36, which are directed to connector 32 for transmission to relay assembly 20 via cable 52. The control unit 36 is similar to the control unit 26 in relay assembly 20. The connector 32 is preferably a plug, which can connect with the connector 33 of cable 52. Preferably, the connector 32 is a female RJ45 connector. Although the occupancy sensor 30 is described as having one connector 32, it is understood that the occupancy sensor 30 can include more than one connector.

Figure 4:
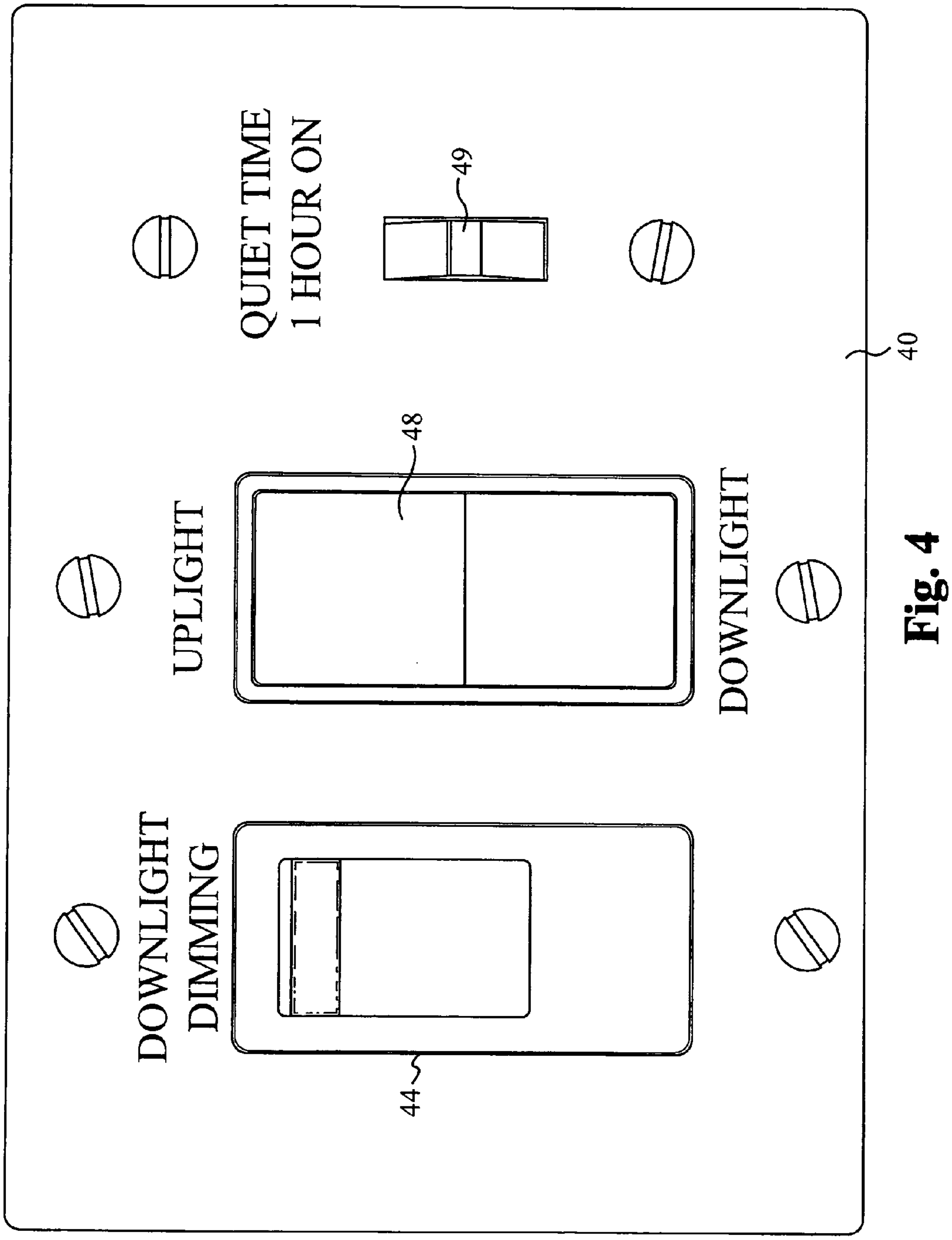
FIG. 4 shows an exemplary front panel implementation of the control switch.

The control switch 40, shown in FIG. 4, preferably includes an on-off switch 48, a momentary disabling switch 49, a dimmer switch 44, a control unit 46, and a connector 42. The control unit 46 is coupled to the on-off switch 48, the momentary disabling switch 49, the dimmer switch 44, and the connector 42. In the preferred embodiment, the control unit 46 and the connector 42 are configured on a single circuit control board. Alternatively, the control unit 46 is separate from the connector 42. The control unit 46 is similar to the control unit 26 in relay assembly 20. The connector 42 is preferably a plug, which can connect with the connector 43 of cable 50. Preferably, the connector 42 is a female RJ45 connector. Although the control switch 40 is described as having one connector 42, it is understood that the control switch 40 can include more than one connector.

The on-off switch 48 provides the ability to switch between two modes of operation, a general mode and an audio/video (A/V) mode. The general mode preferably corresponds to the off position on the on-off switch 48, and the A/V mode preferably corresponds to the on position. Alternatively, a three-way switch can be used in place of the on-off switch 48. Each of the light fixtures 2, 4, and 6 include a plurality of light generating means, such as fluorescent bulbs. Within each light fixture 2, 4, and 6, the plurality of fluorescent bulbs are divided into a first group coupled to a first circuit and a second group coupled to a second circuit. In the general mode, the first group of the fluorescent bulbs are switched on. In the A/V mode, the second group of fluorescent bulbs are switched on. Preferably, the first group of fluorescent bulbs are configured to direct light in all directions, and the second group of fluorescent bulbs are configured to direct light in a downward direction.

The momentary disabling switch 49 is configured to bypass the occupancy sensor 30 for a predetermined time frame. Use of the momentary disabling switch 49 can be used during periods when noise or movement is expected to be at a minimum, but it is desired that the light fixtures 2, 4, and 6 remain on. Turning on the momentary disabling switch 49 prevents the occupancy sensor 30 from turning off the light fixtures 2, 4, and 6.

The dimming switch 44 enables dimming of the light fixtures 2, 4, and 6 when the light fixtures 2, 4, and 6 are on. The dimmer switch 44 is preferably coupled to the second circuits in light fixtures 2, 4, and 6 so as to dim the second group of fluorescent bulbs. Alternatively, the dimmer switch 44 is coupled to the first circuits in light fixtures 2, 4, and 6 so as to dim the first group of fluorescent bulbs. Still alternatively, the dimmer switch 44 is coupled to both the first circuits and the second circuits to dim both the first group and the second group of fluorescent bulbs simultaneously.

Control switch 40 operates using low-voltage which is supplied via cable 50. Occupancy sensor 30 operates using low-voltage which is supplied via cable 52. The control switch 40 and the occupancy sensor 30 are referred to generally as low-voltage periphery devices. Cables 50 and 52 are supplied low-voltage power from the relay assembly 20, which is coupled to the external power source. The control unit 26 includes power circuitry that receives voltage from a conventional high-voltage, external power source and provides low-voltage power to the cables 50 and 52.

In the configuration shown in FIG. 1, a single sensor, occupancy sensor 30, is coupled to the relay assembly 20. In an alternative embodiment, multiple sensors can be configured into the system illustrated in FIG. 1. In this alternative embodiment, the occupancy sensor 30 can include a second connector, and a second occupancy sensor can be coupled to the second connector of occupancy sensor 30 using a plug-in cable of the type described above. In a similar manner, additional sensors can be coupled in series. It is understood that other low-voltage periphery devices can be utilized, including but not limited to light sensors, other sensor devices, control switches, and/or any other device that can be configured to control light fixtures or other appliances.

Figure 2:
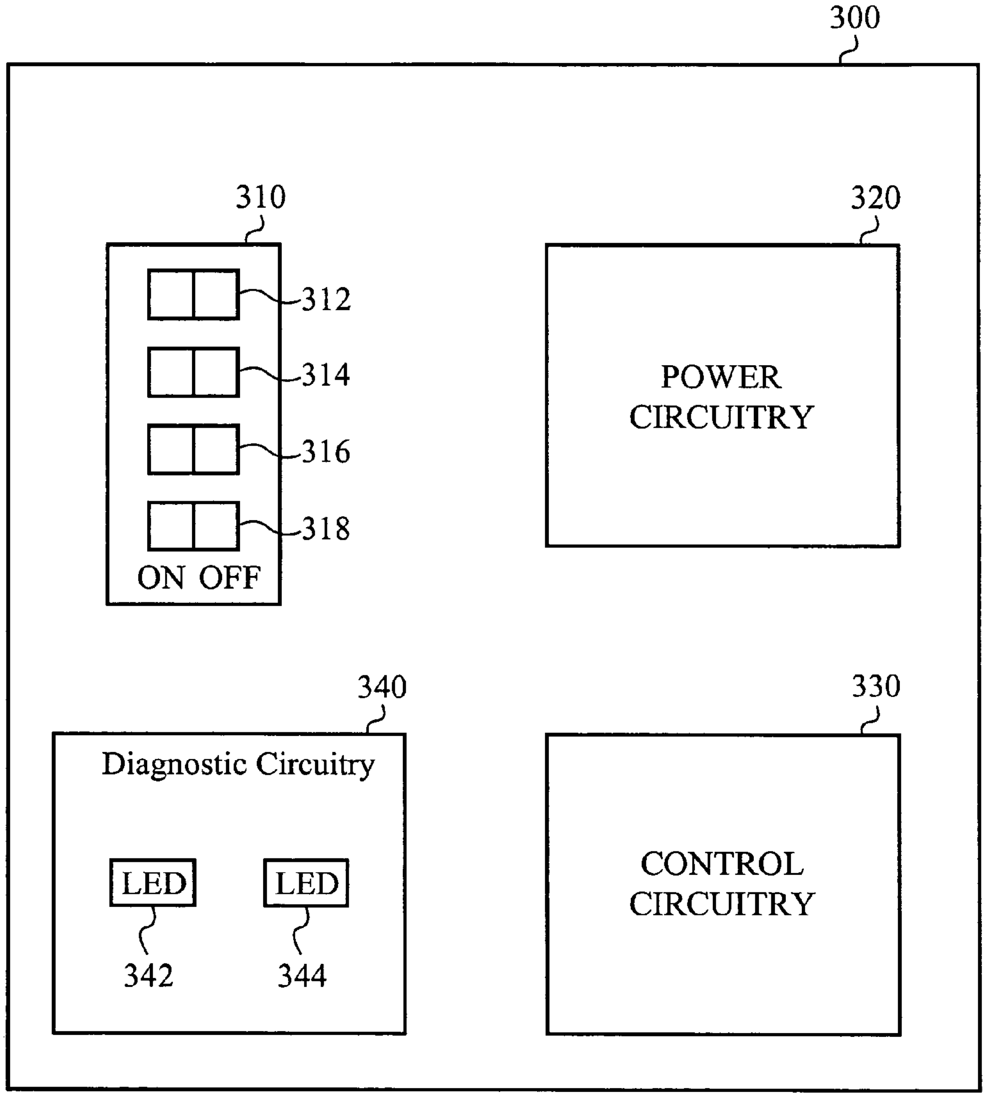
FIG. 2 shows a block diagram of a printed circuit control board included within each control unit.

FIG. 2 illustrates a block diagram of a printed circuit control board 300 included within each control unit. The circuit control board 300 includes override circuitry 310, power circuitry 320, diagnostic circuitry 340, and control circuitry 330. The override circuitry 310 preferably includes a plurality of dip switches 312–318. The dip switches 312–318 provide manual bypass of the occupancy sensor 30 to keep the lights on in the event that the occupancy sensor 30 fails. The dip switches 312–318 also provide manual bypass of the control switch 40.

The power circuitry 320 receives low-voltage power from a connected cable, such as a CAT5 patch cable, in the case where the control circuit board 300 is included within a low-voltage periphery device, such as the control switch 40 (FIG. 1) or occupancy sensor 30 (FIG. 1). In the case where the control circuit board 300 is included within the relay assembly 20 (FIG. 1), the power circuitry 320 receives power from the external power source and provides low voltage power to a connected cable, such as a CAT5 patch cable, which is coupled to a low-voltage periphery device.

The control circuitry 330 provides control signals and manages operation and management protocols between the low-voltage periphery devices and the relay assembly 20. The diagnostic circuitry 340 indicates proper operation of the control circuit board 300. The diagnostic circuitry 340 preferably includes LED indicators 342 and 344, one of which indicates if the circuit control board 300 is receiving power, the other of which indicates whether or not the circuit control board 300 is receiving a signal from the occupancy sensor 30.

Figure 3:
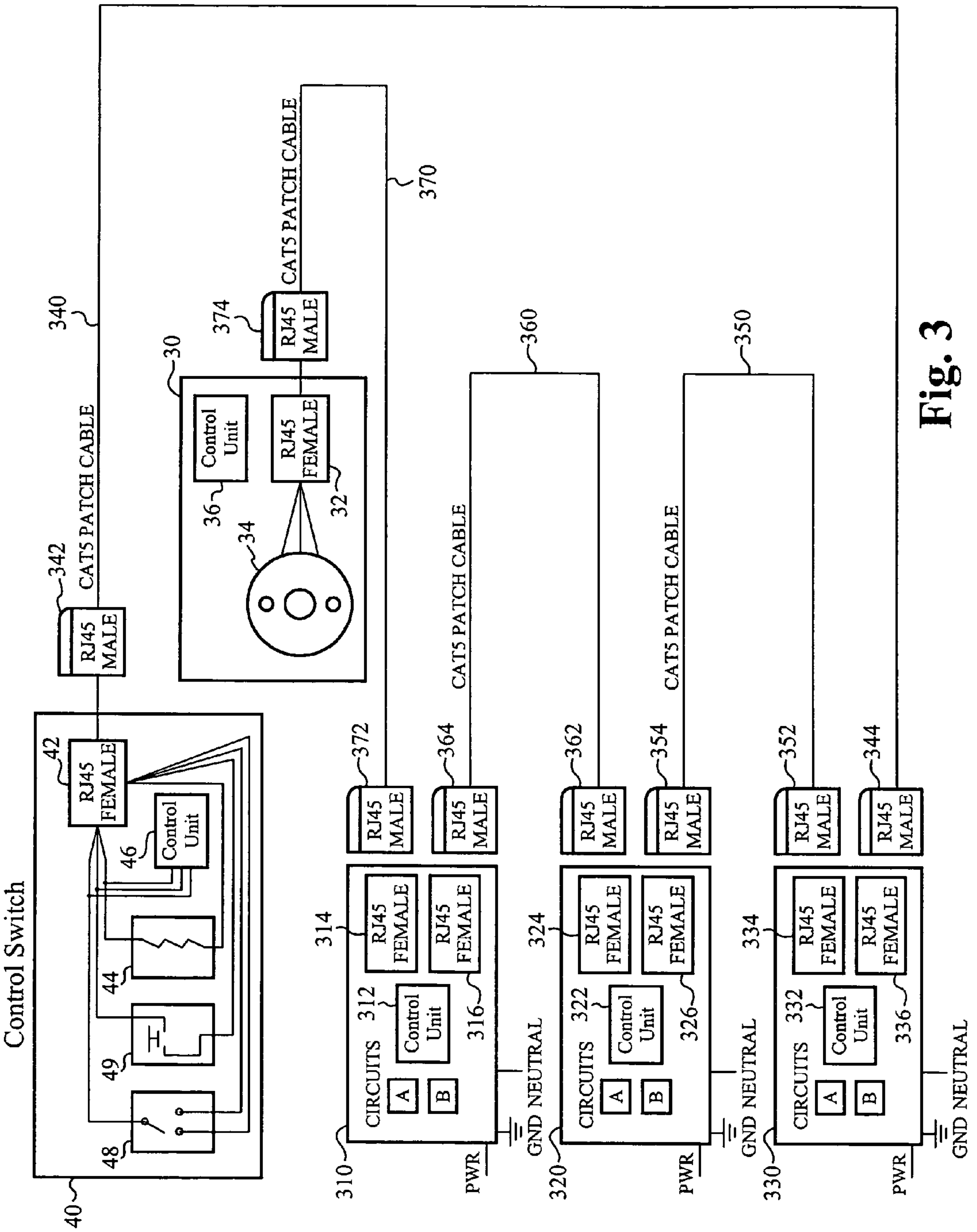
FIG. 3 shows a schematic representation of an exemplary decentralized system as applied to a pre-existing lighting configuration, in accordance with the embodiments of the present invention.

FIG. 3 illustrates an exemplary decentralized system as applied to a pre-existing lighting configuration. Pre-existing configurations are already wired for power distribution to particular locations, such as to previously installed light fixtures. The decentralized system of FIG. 3 replaces the light fixtures 2, 4, and 6 of FIG. 1 with light fixtures 310, 320, and 330. The relay assembly 20 from FIG. 1 is eliminated. The decentralized system of FIG. 3 also includes the control switch 40 and the occupancy sensor 30, which are described in detail above in regard to FIG. 1. Each of the light fixtures 310, 320, and 330 include a first circuit and a second circuit for switching on and off a first group and a second group of fluorescent lights, respectively, as described in detail above. Each of the light fixtures 310, 320, and 330 are connected to a high-voltage, external power source.

Light fixture 310 includes control unit 312 and connectors 314 and 316. In the preferred embodiment, control unit 312 and connectors 314 and 316 are configured on a single circuit control board. Alternatively, the control unit 312 are configured separately from the connectors 314 and 316. Control unit 312 is preferably similar to control unit 26 (FIG. 1). Connectors 314 and 316 are plugs, preferably female CAT5 connectors. Similarly, light fixture 320 includes control unit 322 and connectors 324 and 326, and light fixture 330 includes control unit 332 and connectors 334 and 336. In the preferred embodiment, control unit 322 and connectors 324 and 326 are configured on a single circuit control board, and control unit 332 and connectors 334 and 336 are configured on a single circuit control board. Alternatively, the control unit 322 are configured separately from connectors 324 and 326, and control unit 332 is configured separately from connectors 334 and 336. Control units 322 and 332 are similar to control unit 312. Connectors 324, 326, 334, and 336 are similar to connectors 314 and 316.

Control switch 40, light fixture 310, light fixture 320, light fixture 330, and occupancy sensor 30 are coupled serially to form a logical bus. Control switch 40 is coupled to light fixture 330 via cable 340. Cable 340 includes connectors 342 and 344. Light fixture 330 is coupled to light fixture 320 via cable 350. Cable 350 includes connectors 352 and 354. Light fixture 320 is coupled to light fixture 310 via cable 360. Cable 360 includes connectors 362 and 364. Light fixture 310 is coupled to occupancy sensor 30 via cable 370. Cable 370 includes connectors 372 and 374. Cables 340, 350, 360, and 370 are preferably CAT5 patch cables. Connectors 342, 344, 352, 354, 362, 364, 372, and 374 are preferably male RJ45 connectors.

Low-voltage power is supplied to occupancy sensor 30 from light fixture 310 via cable 370 in a manner similar to that described above in relation to the relay assembly 20 providing power to the occupancy sensor 30 via the cable 52. Similarly, low-voltage power is supplied to control switch 40 from light fixture 330 via cable 340.

Control signals are sent from the control switch 40 to the light fixtures 310, 320, and 330 via cables 340, 350, and 360. Sensor detection signals are sent from the occupancy sensor 30 to the light fixtures 310, 320, and 330 via cables 370, 360, and 350.

In operation, low-voltage periphery devices are serially coupled together with at least one of the devices coupled to a high-voltage device, such as the relay assembly or a light fixture, that is receiving power from a high-voltage external power source. The low-voltage periphery devices can be serially connected to the light fixtures, or connected via an intermediary relay assembly to send control signals that actuate load circuits corresponding to the light fixtures.

An alternative embodiment of the present invention is directed to a system and architecture for supporting and managing lighting through a hub and coupled periphery low-voltage periphery devices. The hub includes a master printed circuit control board that is in electrical communication with a plurality of ports having interconnects such as described above. As in the preferred embodiment, the system of this alternative embodiment can include over-head fluorescent lights, motion detectors, dimming switches, light sensors, thermal sensors and combinations thereof. The hub comprises a plurality of connection ports for coupling to one or more of the low-voltage periphery devices. The hub provides a central bus for distributing power to the low voltage periphery devices and communicating between the low-voltage periphery devices and one or more high voltage devices.

In accordance with the alternative embodiment of the present invention, the hub is coupled to a high-voltage power source and controls a circuit load to a high-voltage device based on control signals received from one or more of the low-voltage periphery devices. The low voltage periphery devices and the hub are in communication through any suitable medium. The low-voltage periphery devices and the hub are in communication through cables that are connected to the hub ports through connector features. The cables are configured to interchangeably couple to a number of different integrated devices and hub ports configured with complementary connecting features.

In accordance with the alternative embodiment, the hub is configured to mount to a ceiling receptacle and provides a seamless canopy bus with connectivity for controlling and managing light fixtures in response to control signals provided by a controller unit. The controller unit is a switch, a sensor or a combination thereof. It will be clear to one skilled in the art that the controller unit is alternatively a light sensor for monitoring a level light, a temperature sensor for monitoring a temperature and/or any other sensor for monitoring a condition inside a room or outside the room, wherein adjusting a level of a high voltage device, such as a light, in a controlled room is appropriate.

Figure 5:
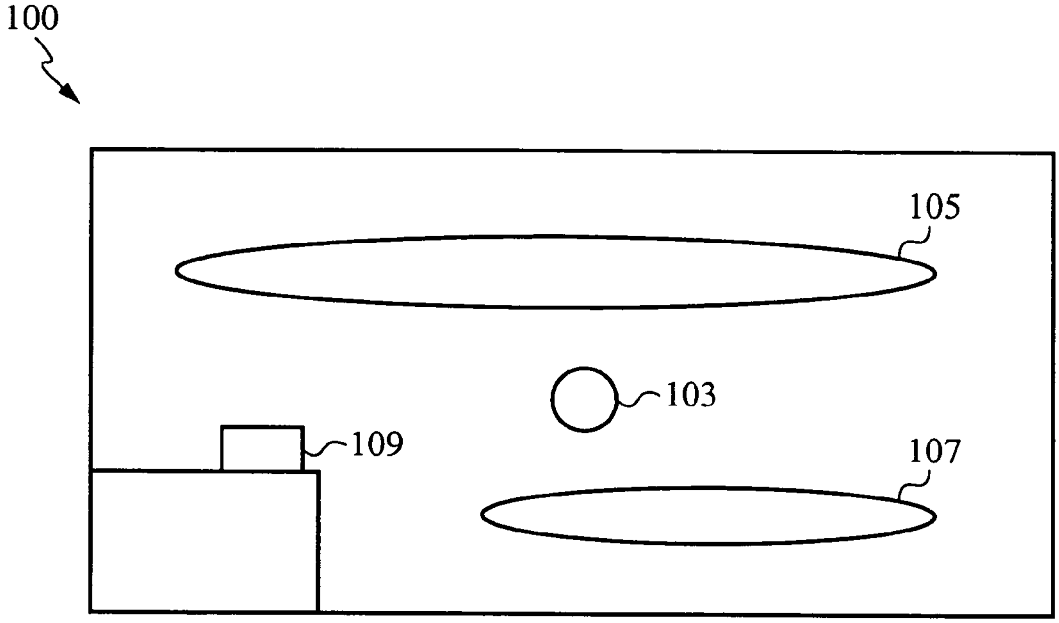
FIG. 5 shows a schematic representation of a room with a canopy light control bus, in accordance with the embodiments of the present invention.

FIG. 5 shows a schematic representation of a room 100 with a canopy light control system, in accordance with the alternative embodiment of the present invention. The room 100 comprises over-head light fixtures 105 and 107 that are fluorescent light fixtures, each configured to energize two or more fluorescent bulbs (not shown). The room 100 also has a control station 109 which can include a switch for turning the light fixtures 105 and 107 on and off, for dimming the light fixtures 105 and 107, and/or adjusting light output from the light fixtures 105 and 107 based on program protocols. The system also includes a hub 103 that is configured to couple to a ceiling receptacle in the room 100 and to provide connectivity between one or more low-voltage periphery devices, such as a motion sensor detector, as described above. The hub 103 provides a central connection for integrating system low-voltage periphery devices and for controlling circuit loads to the light fixtures 105 and 107. Circuit loads can be generated by manual operation, execution of a system program, and/or in response to control signals received by one or more of the low-voltage periphery devices, such as a sensor (not shown in FIG. 5).

Figure 6:
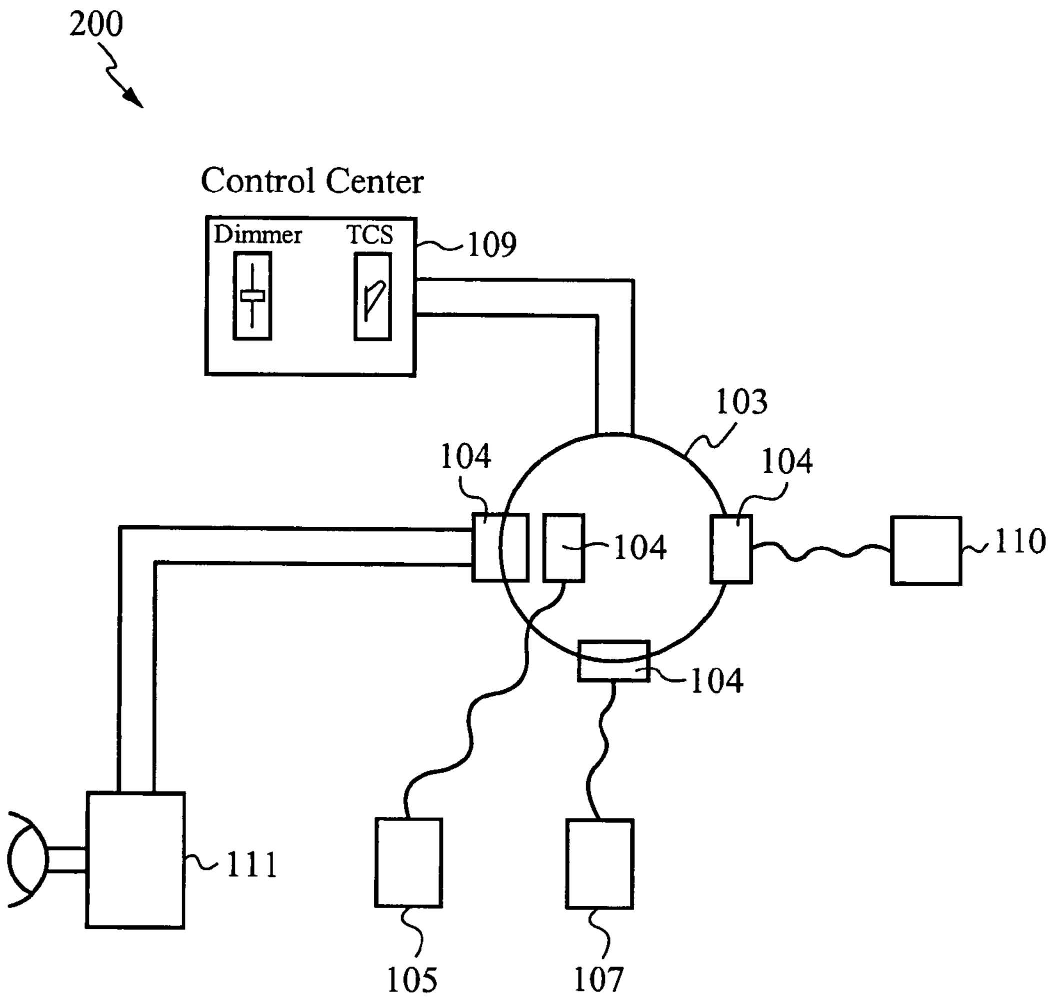
FIG. 6 shows a schematic representation of a light control bus comprising a hub, in accordance with the embodiments of the present invention.

FIG. 6 shows a schematic representation of a light control bus 200 implemented within the room 100 of FIG. 1. The light control bus 200 includes the hub 103. The hub 103 has a plurality of ports 104. Each of the plurality of ports 104 is configured for connecting to a low-voltage line. The hub 103 is configured to couple to the control station 109 and one or more low-voltage periphery devices 110 and 111, such as described above, to control circuit loads to over-head light fixtures 105 and 107. The control station 109 is a switch. The hub 103 can include a printed circuit board and/or a micro processor for switching or adjusting light conditions within a room and for providing the necessary connections between the ports 104. The control station 109, the light fixtures 105 and 107, and the low-voltage periphery devices 110 and 111 are coupled to the hub 103 through cables with connection features that fit or snap into the hub ports 104 with complementary connection features. The hub ports 104 each are configured with female RJ45 connectors and each cable is a CAT5 cable with male RJ45 connectors at either end. It should be understood that other types of complementary connectors can be used to configure the hub ports 104 and the cables. Each of the low voltage periphery devices 110 and 111 is configured with RJ45 interconnects.

In operation, the hub 103 is coupled to a high-voltage, external power source. Light fixtures 105 and 107 receive high-voltage power from the hub 103. The hub 103 also provides low-voltage power to the low-voltage periphery devices 110 and 111. Operation of the switch 109 sends control signals to the hub 103 for controlling the light fixtures 105 and 107. Low-voltage periphery devices 110 and 111 send sensor detection signals to the hub 103. In response to the received sensor detection signals, the hub 103 adjusts the light output of the light fixtures 105 and 107.

While the present invention has been described as including or using motions sensor and light sensors for controlling lights, it will be clear to one skilled in the art that other sensors, such as a temperature sensors or any other sensor for monitoring a condition inside a room or outside the room, are within the scope of the present invention. Also, while the low-voltage bus has been described as being assembled with cables, nodes and/or devices can alternatively be integrated with a wireless bus architecture.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the present invention.

What is claimed is:

1. A decentralized low-voltage bus for managing a load circuit, the decentralized low-voltage bus comprising:

a) a plurality of nodes;

b) a control unit at each of the nodes;

c) a sensor directly coupled to at least one of the plurality nodes;

d) a control switch directly coupled to at one of the plurality of nodes;

e) lights electrically coupled to at least one of the plurality of nodes; and f) means for changing a mode of operation of the sensor or the control switch wherein the lights are controlled by the control units in response to control signals from the sensor unit and the control switch that are transmitted over the low-voltage bus.

2. The decentralized low-voltage bus of claim 1, further comprising cables for electrically coupling each of the plurality of the nodes through the control units.

3. The decentralized low-voltage bus of claim 2, wherein the control units and the cables comprise RJ45 interconnects.

4. The decentralized low-voltage bus of claim 3, wherein each of the plurality of control units includes a printed circuit control board with printed circuit logic that allows each node to operate in accordance with an operation or management protocol.

5. The decentralized low-voltage bus of claim 2, wherein the sensor and the control switch are low-voltage periphery devices that are powered from the load circuit.

6. The decentralized low-voltage bus of claim 5, wherein the sensor and the control switch are powered from the load circuit through the cables.

7. The decentralized low-voltage bus of claim 5, wherein control signals are provided from the low-voltage periphery devices via the cables.

8. The decentralized low-voltage bus of claim 1, wherein at least one of the control units comprises an LED display for indicating a mode of operation.

9. The decentralized low-voltage bus of claim 1, wherein the means for changing a mode of operation of the sensor or the control switch comprises a dip switch coupled to at least one of the control units.

10. The decentralized low-voltage bus of claim 1, wherein the control switch includes a momentary switch and a dimmer switch.

11. The decentralized low-voltage bus of claim 1, wherein the lights are coupled to an external power source.

12. The decentralized low-voltage bus of claim 11, wherein each light comprises one of the plurality of control units, and a low-voltage power is supplied by the lights to the decentralized low-voltage bus via the control units within the lights.

13. The decentralized low-voltage bus of claim 1, further comprising a relay assembly to interface the decentralized low-voltage bus, the lights, and an external power source.

14. The decentralized low-voltage bus of claim 13, wherein the relay assembly includes one of the plurality of control units to provide low-voltage power to the decentralized low-voltage bus and to receive control signals from the sensor and the control switch.

15. The decentralized low-voltage bus of claim 14, wherein the relay assembly is coupled to the load circuit.

16. A decentralized low-voltage bus for managing a load circuit, the low-voltage bus comprising:

a) a sensor node with a sensor detecting unit;

b) a switch node with a switch and switch control unit, the switch node comprising an indicator which indicates if a signal is being received from the sensor; means for changing a mode of operation of the sensor control unit or the control switch unit;

c) a plurality of light nodes each with a light control unit and a light fixture that is electrically coupled to the load circuit; and d) low-voltage cables for electrically coupling each of the sensor node, the switch node and the plurality of light nodes over the decentralized low-voltage bus, wherein the sensor and the switch are powered by the load circuit and the load circuit is controlled in response to control signals transmitted from the sensor over the low-voltage bus to each of the light control units.

* * * * *